United States Patent
Nakanura

[11] Patent Number: 5,548,789
[45] Date of Patent: Aug. 20, 1996

[54] MESSAGE COMMUNICATION PROCESSING APPARATUS FOR SELECTIVELY CONVERTING STORING AND TRANSMITTING MESSAGES OF DIFFERENT LENGTHS

[75] Inventor: Yasuo Nakanura, Yokohama, Japan

[73] Assignee: Canon Kabushiki Kaisha, Tokyo, Japan

[21] Appl. No.: 403,117

[22] Filed: Mar. 13, 1995

Related U.S. Application Data

[63] Continuation of Ser. No. 823,465, Jan. 22, 1992, abandoned.

[30] Foreign Application Priority Data

Jan. 24, 1991 [JP] Japan .................................. 3-007061
Nov. 14, 1991 [JP] Japan .................................. 3-299267

[51] Int. Cl.⁶ .............................................. G06F 15/167
[52] U.S. Cl. .......................... 395/853; 379/89; 358/402; 395/200.08; 395/250; 395/888
[58] Field of Search ..................................... 395/200, 250, 395/325, 200.08, 853, 888; 379/89; 358/402

[56] References Cited

U.S. PATENT DOCUMENTS

| | | | |
|---|---|---|---|
| 4,523,276 | 6/1985 | Maejima et al. | 395/427 |
| 4,873,520 | 10/1989 | Fisch et al. | 340/825.44 |
| 4,972,462 | 11/1990 | Shibata | 379/89 |
| 5,099,340 | 3/1992 | Kamada et al. | 358/403 |
| 5,146,488 | 9/1992 | Okada et al. | 379/88 |
| 5,187,735 | 2/1993 | Herrero Garcia et al. | 379/88 |
| 5,208,676 | 5/1993 | Inui | 358/296 |

*Primary Examiner*—Ken S. Kim
*Attorney, Agent, or Firm*—Fitzpatrick, Cella, Harper & Scinto

[57] ABSTRACT

Control is executed in such a manner that storage and forward exchange can be performed even when a communication message comprising media information sent from a communication terminal exceeds a predetermined message length, thus improving the utilization efficiency of the system as a whole. Specifically, when a mailbox registration request message addressed to one terminal is received by a mail processing apparatus through a communication controller upon having been sent from another terminal via a network, a main controller determines whether the received message exceeds a predetermined maximum message length. If it does, then it is determined if a media classification is indicative of image information. In case of image information, it is determined by a media table whether the terminal for which the message is destined is capable of receiving the image information. If this terminal is one capable of processing the image information, the message is sent to the terminal automatically by executing mail allotting processing. If the maximum message length is exceeded, the media information of the communication message is compressed and converted into a media information type capable of being processed by the terminal for which the message is destined. This makes it possible to store the communication message.

12 Claims, 17 Drawing Sheets

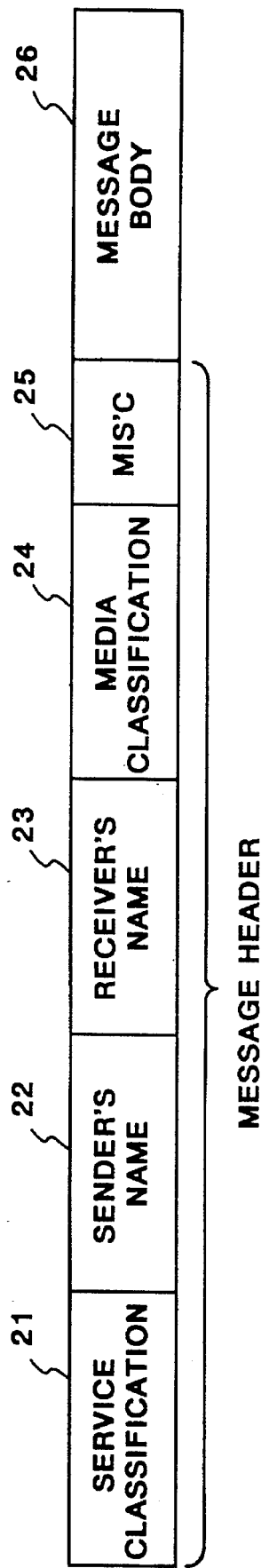
F I G. 2

| PROCESSABLE MEDIA / TERMINAL CLASSIFICATION | CHARACTER | IMAGE | AUDIO |
|---|---|---|---|
| TERMINAL A | ○ | | |
| TERMINAL B | | ○ | |
| TERMINAL C | ○ | ○ | |
| TERMINAL D | | | ○ |
| TERMINAL E | ○ | | ○ |
| TERMINAL F | | ○ | ○ |
| TERMINAL G | ○ | ○ | ○ |

FIG. 3

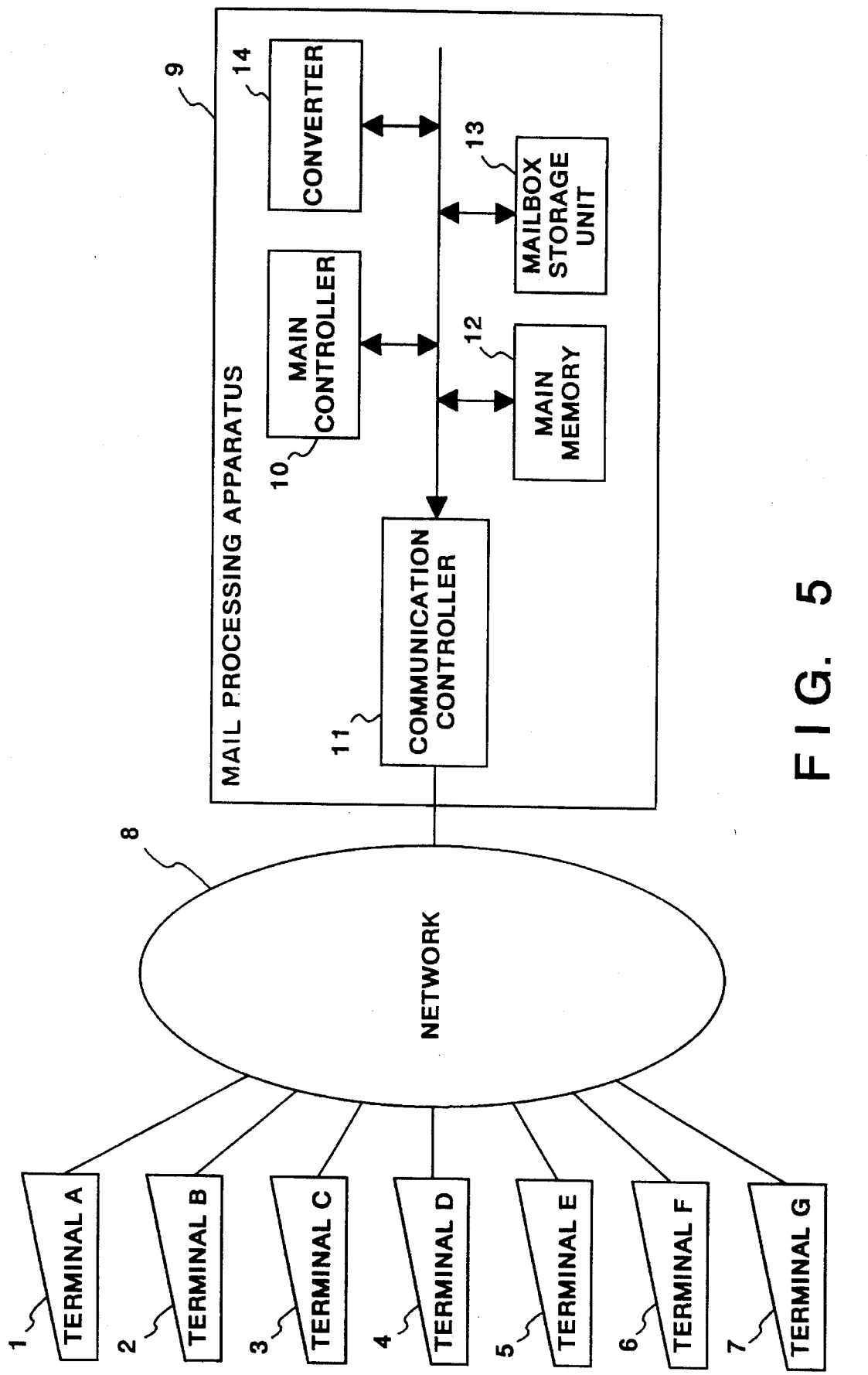
F I G. 5

MAXIMUM MESSAGE LENGTH CONTROL TABLE (MAXT)

| MEDIA CLASSIFICATION | MAXIMUM MESSAGE LENGTH |
|---|---|
| CHARACTER | ML1 |
| IMAGE | ML2 |
| CHARACTER+IMAGE | ML3 |
| AUDIO | ML4 |
| CHARACTER+AUDIO | ML5 |
| IMAGE+AUDIO | ML6 |
| CHARACTER+IMAGE+AUDIO | ML7 |
| - - - - - | |
| | |

FIG. 11

MAILBOX CONTROL TABLE (MBCT)

| MB NUMBER | MAXIMUM STORAGE QUANTITY | PRESERVED STORAGE QUANTITY | MAXIMUM MESSAGE LENGTH | NUMBER OF PRESERVED MESSAGE | MESSAGE CONTROL TABLE ADDRESS |
|---|---|---|---|---|---|
| MB1 | MV1 | CV1 | ML1 | SC1 | SA1 |
| MB2 | MV2 | CV2 | ML2 | SC2 | SA2 |
| ---- | ---- | ---- | ---- | ---- | ---- |
| MBn | MVn | CVn | MLn | SCn | SAn |

FIG. 12

MESSAGE CONTROL TABLE (MSCT)

| MESSAGE NUMBER | SENDER'S NAME | RECEIVER'S NAME | TITLE | DATE OF REGIS-TRATION | EFFECTIVE TERM | MEDIA CLASSIFI-CATION | INFOR-MATION QUANTITY V | MESSAGE STORAGE ADDRESS |
|---|---|---|---|---|---|---|---|---|
| 1 | | | | | | | | |
| 2 | | | | | | | | |
| ----- | ----- | ----- | ----- | ----- | ----- | ----- | ----- | ----- |
| m | | | | | | | | |

FIG. 13

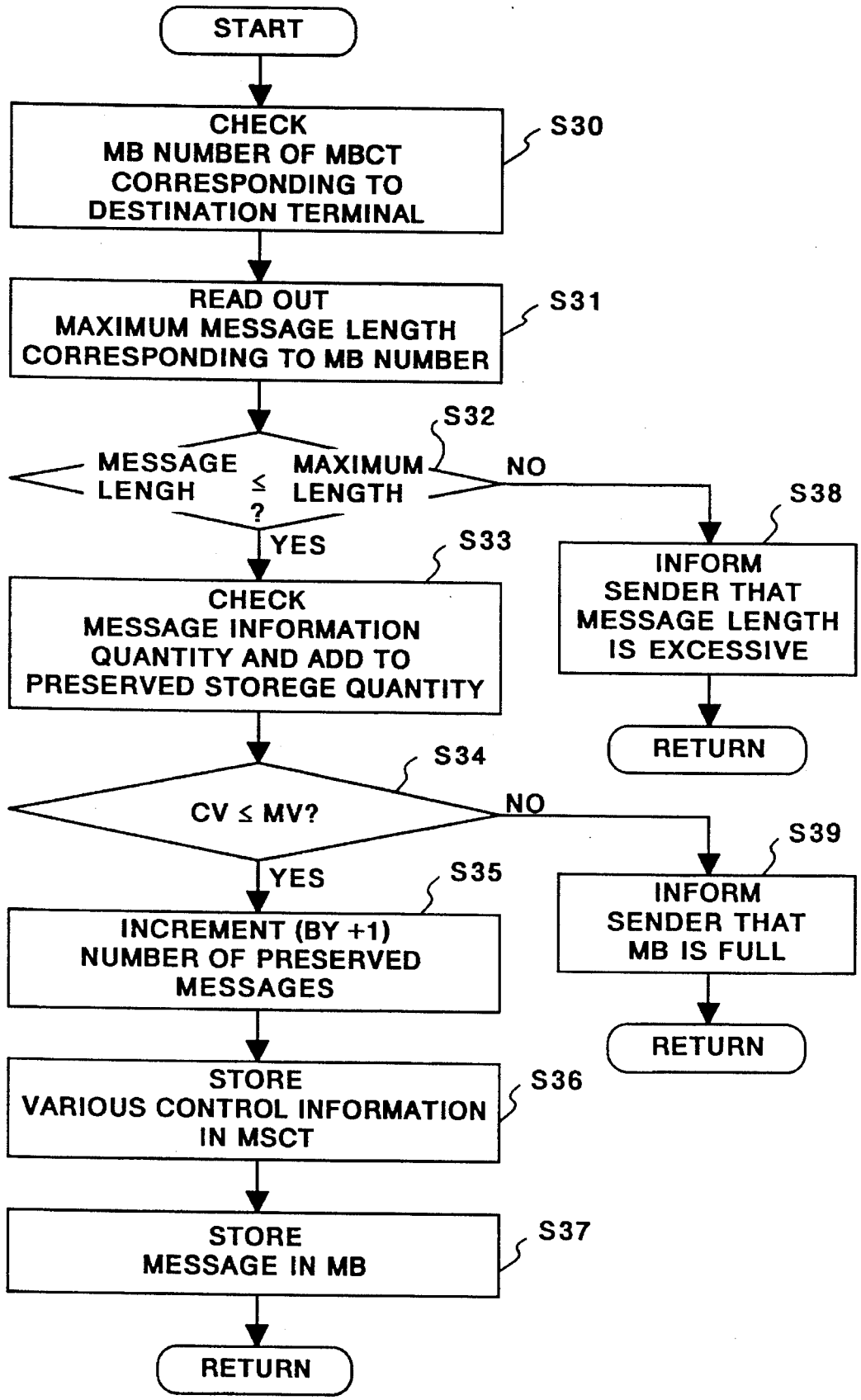
F I G. 15

MESSAGE COMMUNICATION PROCESSING APPARATUS FOR SELECTIVELY CONVERTING STORING AND TRANSMITTING MESSAGES OF DIFFERENT LENGTHS

This application is a continuation of application Ser. No. 07/823,465, filed Jan. 22, 1992, now abandoned.

BACKGROUND OF THE INVENTION

1. Field of the Invention

This invention relates to a message communication processing system and, more particularly, to a message communication processing system comprising a communication terminal for processing at least one type of media information from multimedia, and a center apparatus having a function for storing and forward exchanging messages as media information.

2. Description of the Prior Art

An electronic mail system is known in the art generally as an example of a message communication processing system of this kind and comprises a communication terminal for processing at least one type of media information from multimedia, and a center apparatus (a mail processing apparatus) having a function for storing and forward exchanging communication messages, which consist of media information. A mailbox service is available as one basic function of such an electronic mail system. When the sender of mail (hereinafter referred to simply as the "sender") transmits a message in accordance with the mailbox service, the message is registered in storing means, which is referred to as a "mailbox" for the individual (hereinafter referred to simply as the "receiver") receiving the mail, provided in the mail processing apparatus. After the message has been registered, the receiver accesses his own mailbox and extracts the message intended for him, thereby making it possible to receive the message from the sender.

Using the system described above is advantageous in that a transmission can be made without requiring that the transmitting side take into account the circumstances on the receiving side, and the receiving side is capable of receiving mail addressed to it at any time that is convenient for the receiving side.

In the mail system described above, the storage capacity of the mailboxes prepared for every receiver is limited, and therefore the maximum length of a message that is capable of being stored is stipulated in advance. In a case where the sender has transmitted a communication message in excess of the stipulated length, the mail processing apparatus suspends the processing for storing this communication message and notifies the sender of the fact that the communication message has exceeded the stipulated length.

However, in an electronic mail system which handles multimedia information, the messages are of all sorts and kinds and the amounts of information which they contain are arbitrary. For example, the amount of information in a message comprising image information generally is ten times or more that in a message comprising character information. Accordingly, in the electronic mail system described above, the following drawbacks are encountered since the maximum length of a communication message capable of being stored is fixed:

(1) If the maximum length of messages is set to be comparatively small, there will be a greater probability that messages containing a large amount of information as in the case of image information will exceed the maximum message length when mail is transmitted, and it will not be possible to register such messages in a mailbox.

(2) If the maximum length of messages is set to be comparatively large, the probability that messages having a large amount of information, as in the case of image information, will be capable of being registered in a mailbox will rise. Conversely, however, if messages having comparatively little information, as in the case of character information, are generated frequently, it will become necessary to provide the system with more memory than required, the efficiency at which memory is used will decline and, as a result, this will invite a decline in the number of messages capable of being handled by the system as a whole.

Accordingly, in a conventional electronic mail system which deals with a single medium, as in the case of a text mail system which handles character information only or a facsimile mail system which handles image information only, significant problems do not arise even if maximum message length is fixed. However, in an electronic mail system which deals with multimedia information, greater flexibility is required is terms of dealing with maximum message length.

SUMMARY OF THE INVENTION

Accordingly, an object of the present invention is to provide a message communication processing system in which storage and forward exchange can be performed even in a case where a communication message comprising media information sent from a communication terminal exceeds a predetermined message length, thereby making it possible to raise the utilization efficiency of the system as a whole.

Another object of the present invention is to provide a message communication processing system in which the maximum length of storable messages is set in dependence upon the classification of the media information and the maximum length is changed in dependence upon the remaining storage capacity of storing means, thereby making it possible to control multimedia information while processing the maximum length of communication messages in a versatile manner.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram showing the format of messages used in this embodiment;

FIG. 3 is a diagram showing the details of a table of media capable of being processed, wherein the correspondence is shown between the processable media and terminal classifications in a main memory according to this embodiment;

FIG. 5 is a system block diagram illustrating a multimedia message communication processing system according to second and third embodiments of the present invention;

FIG. 11 is a diagram showing a table for managing maximum message length in FIG. 10;

FIG. 12 is a diagram showing a table for mailbox control in FIG. 10;

FIG. 13 is a diagram showing a table for message control in FIG. 10;

FIG. 15 is a flowchart illustrating a mailbox registration processing routine of FIG. 14;

DESCRIPTION OF THE PREFERRED EMBODIMENTS

Preferred embodiments of the present invention will now be described in detail with reference to the accompanying drawings.

<First Embodiment>

As a first embodiment of the invention, a message communication processing system will be described in which, when a transmitted message is in excess of a predetermined message length, the message is capable of being transmitted automatically in dependence upon the function of the communication terminal on the receiving side.

Figure 1:
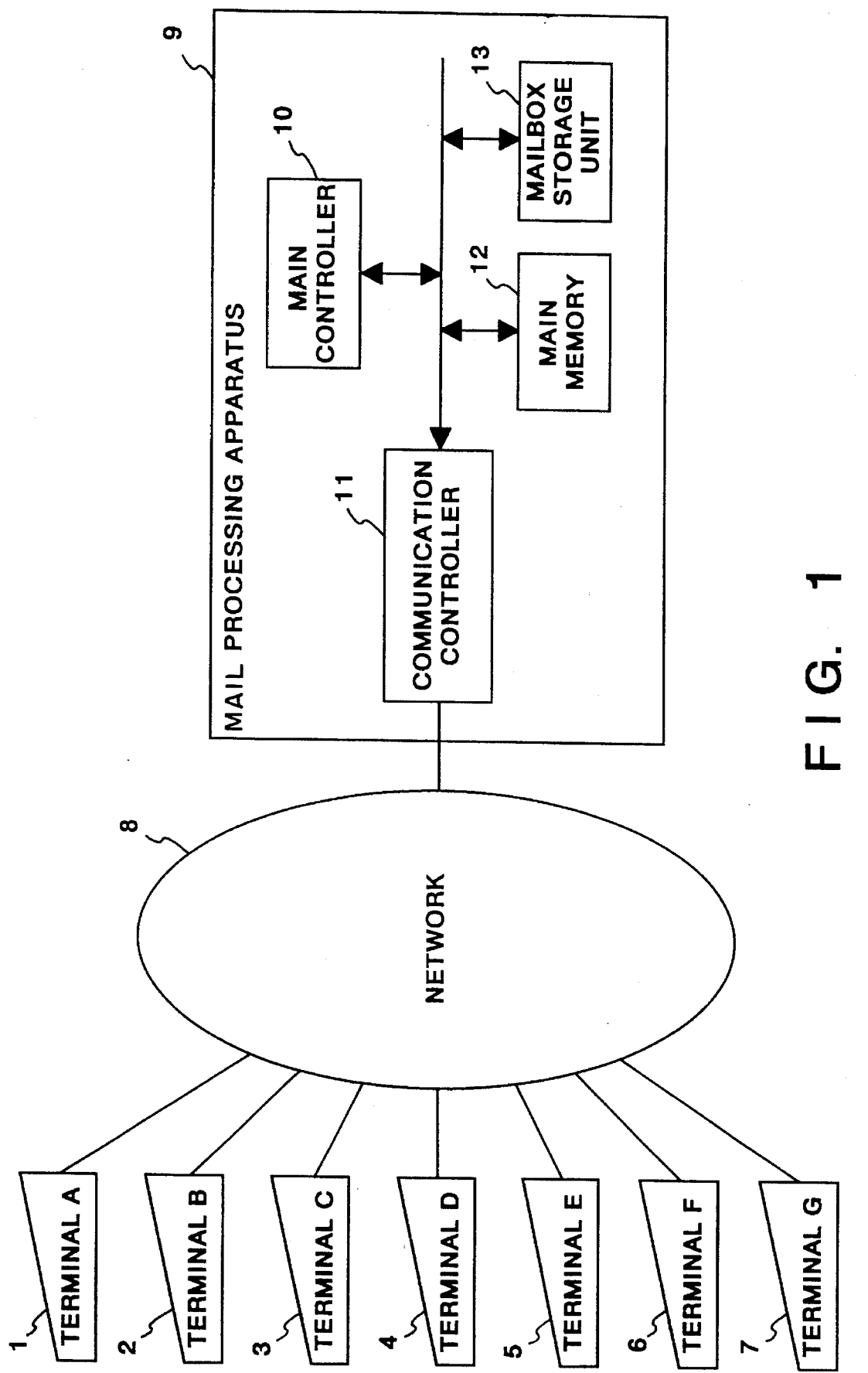
FIG. 1 is a system block diagram illustrating a multimedia message communication processing system according to a first embodiment of the present invention.

FIG. 1 is a system block diagram illustrating a multimedia message communication processing system according to a first embodiment of the present invention. As shown in FIG. 1, the processing system includes a group of mail terminals (A~G) serving as terminal devices capable of communicating messages with a mail processing apparatus 9 via a network 8. The terminal devices 1~7 have the terminal attributes of A~G, as shown in FIG. 3. More specifically, the group of mail terminals (A~G) include telematic terminals such as a teletex and facsimile, audio terminals having an audio input/output function, and combined terminals which are combinations of the above. The network 8 is connected to the mail processing apparatus 9 and to each of the mail terminals 1~7 and includes a public network (e.g., a digital data network, leased circuits, a telephone network, an ISDN) and a private network (e.g., a LAN, a PBX). The mail processing apparatus 9 serves as a center apparatus of the message communication processing system and performs storage and forward exchange.

As illustrated in FIG. 1, the mail processing apparatus 9 includes a main controller 10 for administering overall control of the mail processing apparatus 9 in accordance with a processing procedure (program) that has been stored in a main memory 12, described below, a communication controller 11 for controlling connection to the network 8, the aforementioned main memory 12 for storing the above-mentioned mail processing program as well as communication data and a table holding media capable of being processed by the group of mail terminals A~G, and a mailbox storage unit 13, which is constituted by a magnetic disk device or the like, for storing mailboxes allocated to each of the mail terminals A~G.

FIG. 2 is a diagram illustrating an example of a message format used in the multimedia communication processing system of this embodiment. The format includes a header portion comprising fields 21 through 25, and a message body 26. The fields constituting the message header portion are a service classification field 21 which designates a mailbox service, a confidential service, etc., a sender's name field 22 for writing in the name of the sender, a receiver's name field 23 for writing in the name of the receiver, a media classification field 24 for writing in the media type, such as character, image or audio, and a miscellaneous field 25 for writing in other information, such as comments. The information written in the message body field 26 deals with all media capable of being handled as digital data.

FIG. 3 is a diagram showing the details of a table of the media capable of being processed, wherein the correspondence is shown between the processable media and the classification of terminals capable of being connected to the system. The table is created in the main memory 12. The circles in the table indicate the media that are processable on the terminal side. For instance, in the example of FIG. 3, terminal A corresponds to a teletex, terminal B to a facsimile, terminal C to a mixed mode terminal, and terminal D to a telephone. The terminals E through G correspond to terminals which are a combination of the above.

Figure 4:
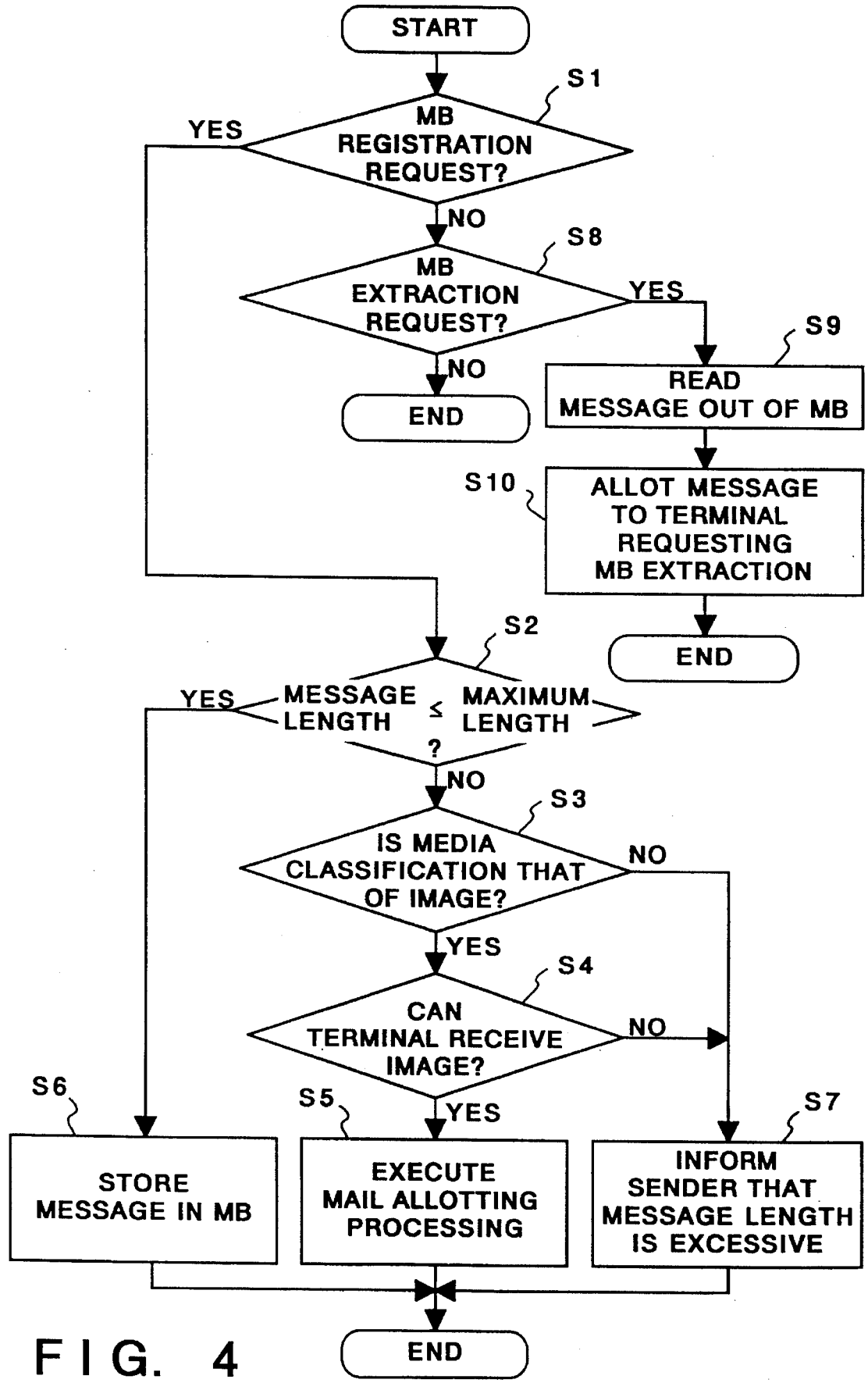
FIG. 4 is a flowchart showing mailbox service processing according to the first embodiment.

The details of mail exchange processing in the mail processing apparatus 9 constructed as set forth above will now be described in accordance with the flowchart of FIG. 4.

As mentioned above, the mail processing apparatus 9, which is under the control of the main controller 10, executes the processing indicated below in accordance with a mail processing program that has been stored in the main memory 12. In the discussion that follows, an exemplary case will be described in which mail is sent from the terminal B2 to the terminal C3 using a mailbox service.

When a mailbox (hereinafter referred to as "MB") registration request message addressed to the terminal C3 is received by the mail processing apparatus 9 through the communication controller 11 upon having been sent from the terminal B2 via the network 8, the main controller 10 causes processing to advance to step S1, at which the service classification field 21 (FIG. 2) of the received message is examined. In a case where a message has been received and the service classification indicates the mailbox service, processing proceeds to step S2, at which MB registration processing is started. At step S2, it is determined whether the received message exceeds a predetermined maximum message length. If the length of the received message is less than the predetermined maximum message length, processing proceeds to step S6, at which ordinary MB registration processing is executed.

It should be noted that mailbox areas for each of the terminals are allocated to the mailbox storage unit 13. In this case, since the receiver field 23 of the received message indicates terminal C3, the message from terminal B2 is stored in the mailbox for terminal C3 in the mailbox storage unit 13.

Meanwhile, on the side of terminal C3, an MB extraction request is directed to the mail processing apparatus 9 and it is determined whether there is a message addressed to this terminal. In the present example, a received message is detected and the service classification field 21 is indicative of the MB extraction request. As a result, the program proceeds from step S8 to step S9 and ordinary MB extraction processing is executed. This processing involves examining the mailbox for terminal C3 in the mailbox storage unit 13 and reading the relevant message. Next, at step S10, the message is allotted to terminal C3, which is the terminal requesting MB extraction.

The foregoing is a simple outline of ordinary mailbox service processing.

Described next will be processing which characterizes this embodiment of the invention, namely processing for a case where the length of a received message exceeds a predetermined maximum message length.

In a case where the received message length is found to exceed the predetermined maximum message length at step S2 described above, the program proceeds to step S3, at which it is determined whether the media classification 24 is indicative of an image. As a result, the program proceeds to step S4 in this case. Here the table of processable media shown in FIG. 3 is investigated, and it is determined whether the terminal which is the destination of the message is capable of receiving an image. In a case where the terminal which is the destination is one capable of processing an image, the program proceeds to step S5, at which mail allotting processing is executed and the pertinent image message is allotted to the terminal at the destination. For example, if the terminal at the destination is capable of processing an image, as is the case with terminals C3, F6 and G7, then mail allotting processing can be carried out.

However, in a case where the destination terminal is terminal A1, D4 or E5, which cannot process video information, the mail allotting processing of step S5 cannot be executed. This takes account of the fact that in text mail or audio mail, generally the natural mode is for the user to accept the mail by accessing the mailbox, whereas in the case of image mail such as facsimile mail, the natural mode is for the system to forcibly transmit the image mail to the receiver's terminal.

In a case where the media classification is not indicative of an image at step S3 or the terminal at the destination is incapable of processing an image at step S4, the program proceeds to step S7, at which the sender is notified of the fact that the message length is in excess of the predetermined length, just as in the prior art, and MB registration processing is suspended.

In accordance with the first embodiment described above, a communication message transmitted by the sender can be transmitted automatically to the communication terminal at the destination even if the message is in excess of the predetermined message length, provided that the media classification of this message is indicative of image information.

In addition, since more memory than necessary need not be set aside in the system, the memory can be used more efficiently and it becomes possible for the system to store more messages overall.

<Second Embodiment>

A second embodiment of the present invention will now be described in detail with reference to the drawings.

This embodiment is so adapted that when a transmitted message exceeds a predetermined message length, the media classification of the message is compressed and converted into a media information type capable of being processed by the communication terminal which is the destination of the message, thereby making it possible to register the message in the mailbox.

FIG. 5 is a system block diagram illustrating a multimedia message communication processing system according to a second embodiment of the present invention. In this embodiment, the mail processing apparatus 9 is equipped with a converter 14 for converting the media classification of a message into a media classification processable by the terminal which is the destination. In other respects, the construction of this apparatus is the same as that shown in FIG. 1.

The details of mail exchange processing performed by the mail processing apparatus 9 constructed as set forth above will now be described with reference to the flowchart shown in FIG. 6.

In the discussion that follows, an exemplary case will be described in which mail is sent from the terminal D4 to the terminal G7 using a mailbox service. Ordinary MB registration processing and MB extraction processing is similar to that of FIG. 4, as indicated in the flowchart of FIG. 6, and this processing need not be described again.

Figure 6:
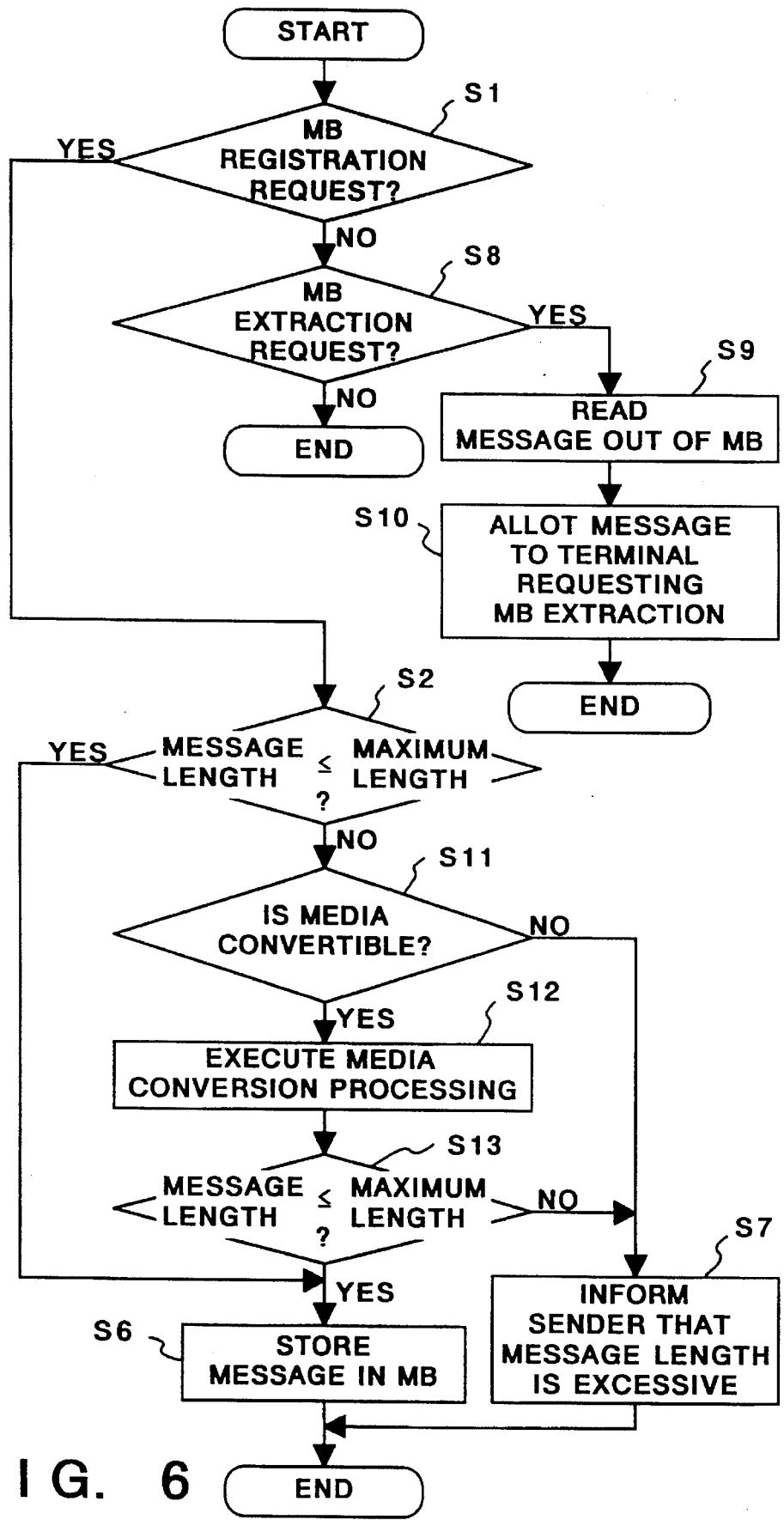
FIG. 6 is a flowchart showing mailbox service processing according to the second embodiment.

If, at step S2 in FIG. 6, it is found that the received message length exceeds the predetermined maximum message length, then the program proceeds to step S11, at which the converter 14 performs a media conversion to convert the media classification of the message and determines whether the volume of the message is capable of being compressed. For example, in a case where the sending terminal is D4 and the media classification of the message is audio, the audio is converted to the character medium by audio recognition processing, thereby making it possible to compress the volume of the message.

In a case where the sending terminal is B2 and a character document of typed characters is transmitted upon being inputted by a scanner, a media conversion is performed to convert the image into characters by character recognition processing, thereby making it possible to compress the volume of the message.

If a media conversion is possible at step S11 in the second embodiment, the program proceeds to step S12, at which the converter 14 is activated to compresses the volume of the message. When media conversion processing by the converter 14 ends, the program proceeds to step S13, at which it is determined whether the length of the compressed message has been made smaller than the predetermined maximum message length. If it is smaller, the program proceeds to step S6, at which the message is stored in the mailbox.

Though a media conversion from image to audio in the processable media table of FIG. 3 becomes necessary also when the sender is terminal B2 and the destination is terminal D4, this is unrealistic since it is nearly impossible to convert all of the image information to audio. Accordingly, when a media conversion is determined to be impossible at step S11 or the length of the message that has been subjected to the media conversion is not found to be smaller than the predetermined maximum message length at step S13, the proceeds to step S7, at which the sender is notified of the fact that the message length is in excess of the predetermined length, just as in the prior art, and MB registration processing is suspended.

In accordance with the second embodiment described above, the media classification of a communication message transmitted by the sender can be compressed and converted to a media information type processable by the communication terminal at the destination even if the message is in excess of the predetermined message length. As a result, the message can be registered in the mailbox.

<Third Embodiment>

A third embodiment of the present invention will now be described with reference to the drawings.

The third embodiment deals with a system in which a message for transmission can be transmitted automatically in dependence upon the function of the communication terminal at the destination even if the length of the message is greater than a predetermined message length.

The construction of the system in the third embodiment is similar to that of the second embodiment. Processing for a case where the length of a received message exceeds a predetermined maximum message length will be described with reference to the flowchart of FIG. 7.

Figure 7:
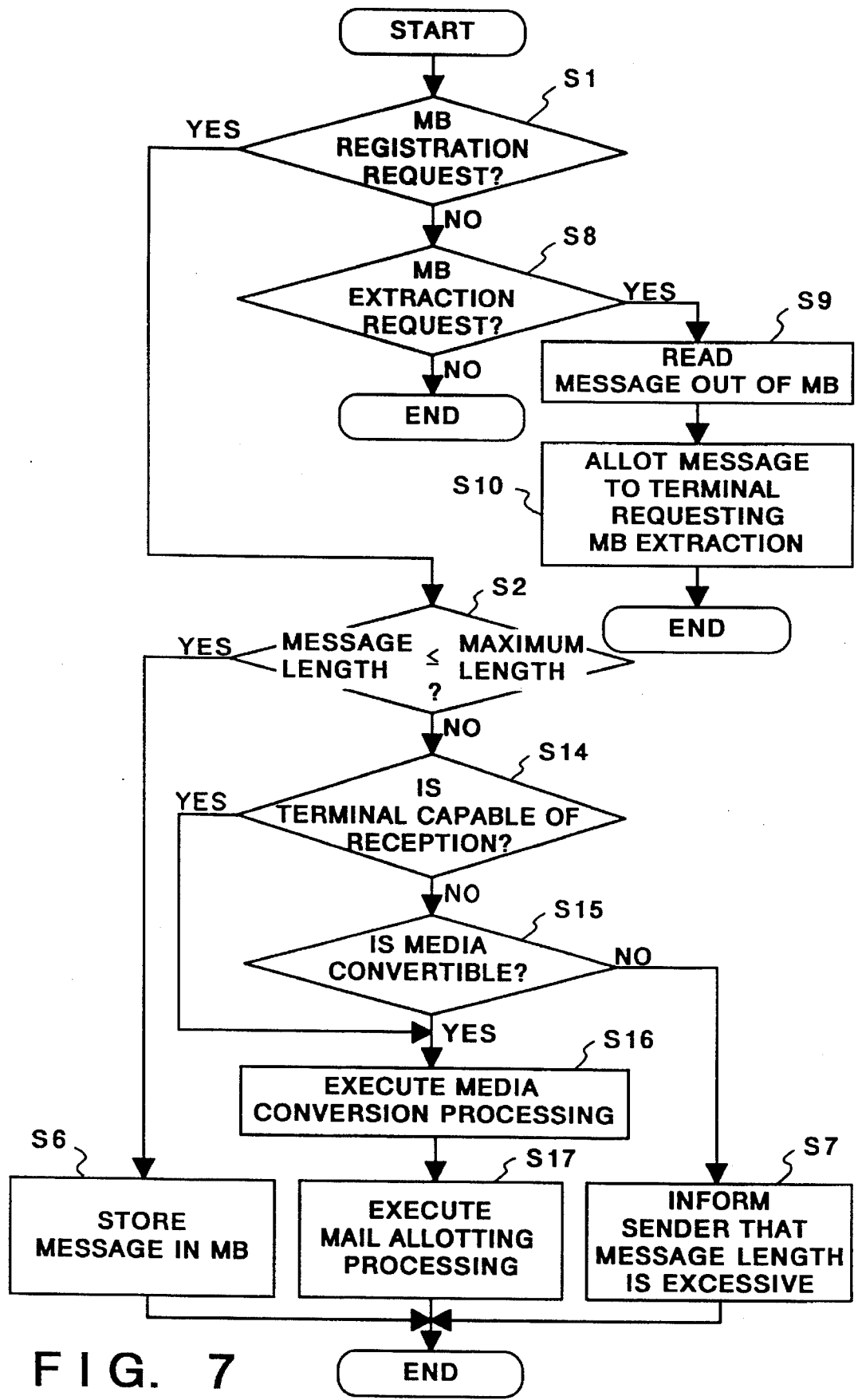
FIG. 7 is a flowchart showing mailbox service processing according to the third embodiment.

If, at step S2 in FIG. 7, it is found that the received message length exceeds the predetermined maximum message length, then the program proceeds to step S14, at which the media table shown in FIG. 3 is examined and it is determined whether the terminal which is the destination of the message is capable of receiving it. If the message is an image, for example, and the destination terminal is one capable of processing an image, then the program proceeds to step S17, at which mail allotting processing is executed. However, if the destination terminal is one not capable of reception, then the program proceeds to step S15, at which it is determined whether a media conversion is possible, just as in the second embodiment. If a media conversion is possible, the converter 14 is activated, the media conversion is made and message is compressed in volume. Then, at step S17, mail allotting processing is executed to send the converted message to the destination.

In accordance with the third embodiment described above, a message transmitted by the sender can be transmitted automatically in dependence upon the function of the terminal which is the destination of the message, even if the message length is greater than the predetermined message length.

<Fourth Embodiment>

A fourth embodiment according to the present invention will now be described with reference to the drawings.

Figure 8:
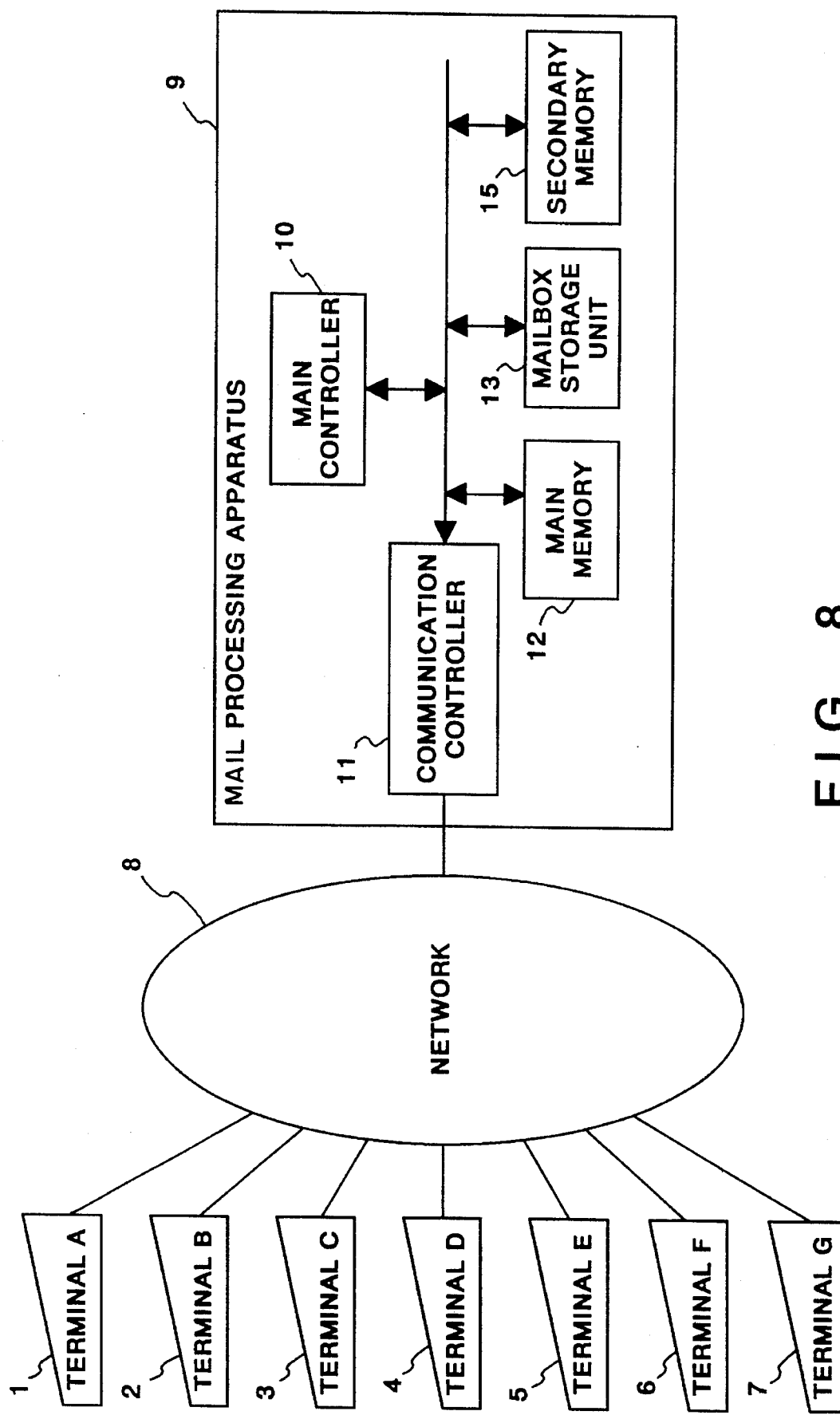
FIG. 8 is a system block diagram illustrating a multimedia message communication processing system according to a fourth embodiment of the present invention.

As illustrated in FIG. 8, the fourth embodiment deals with a system in which the mail processing apparatus 9 is equipped with a secondary memory 15, which is a large-capacity memory device such as an optical disk device, whereby a received message is capable of being stored. As a result, if the length of a received message is greater than a predetermined message length, this system will not suspend transmission of the message but will make it possible to register the received message in a mailbox.

In the system of the fourth embodiment constructed as set forth above, processing for a case where the length of a received message exceeds a predetermined maximum message length will be described with reference to the flowchart of FIG. 9.

Figure 9:
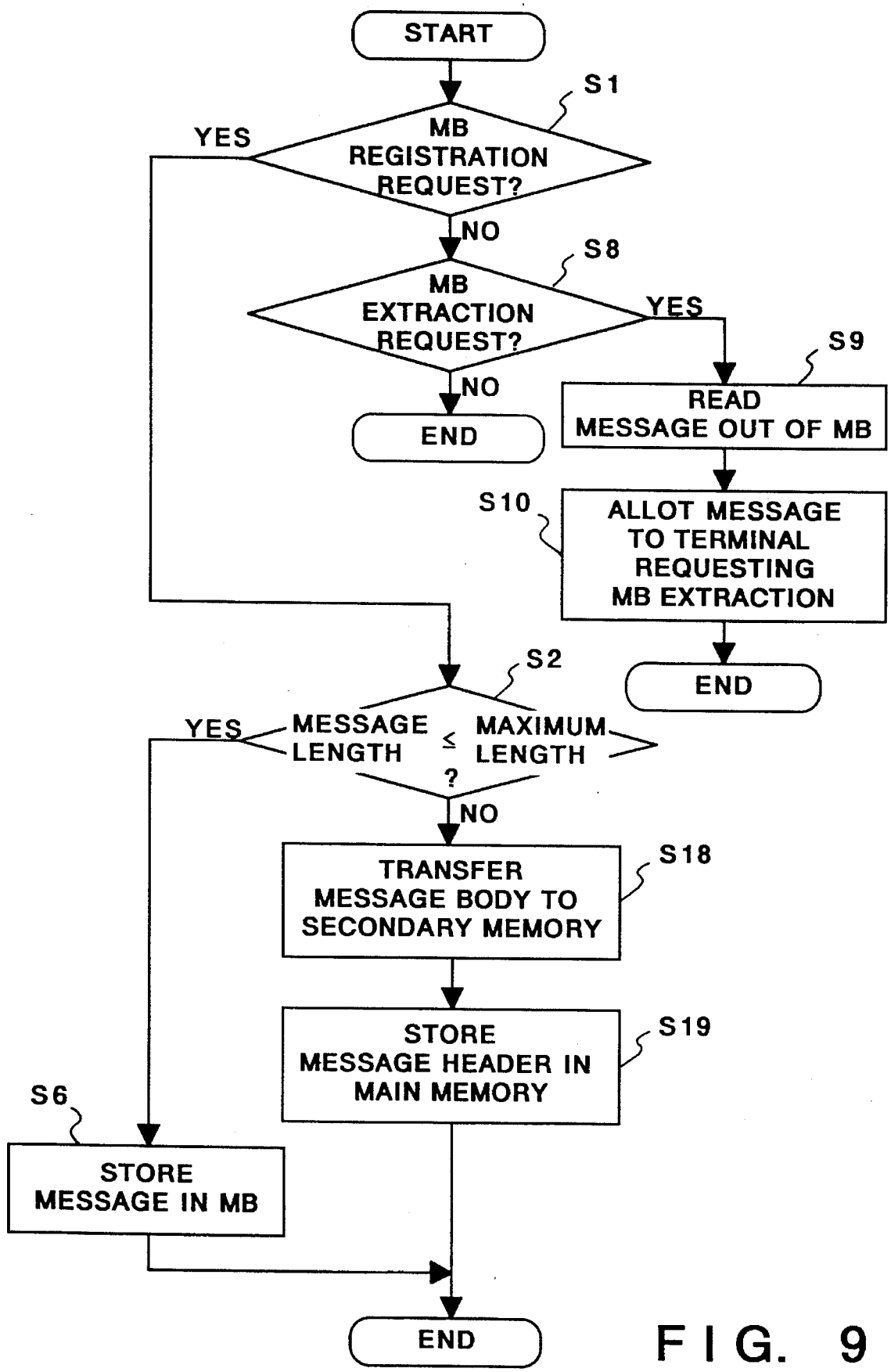
FIG. 9 is a flowchart showing mailbox service processing according to the fourth embodiment.

If, at step S2 in FIG. 9, it is found that the received message length exceeds the predetermined maximum message length, then the program proceeds to step S18, at which the message body is transferred to and stored in the secondary memory 15. Then, at step S19, the header of the message is stored in the main memory 12 along with storage location information, etc., in the secondary memory 15 storing the above-mentioned message.

It will suffice if the header is capable of being retrieved at a later time, or if the header is stored in the mailbox storage unit 13, or if a flag indicating that there is a message stored in the secondary memory 15 is set and the rest is stored in the secondary memory 15.

In accordance with the fourth embodiment described above, a message whose length is less than a predetermined length is stored in the mailbox storage unit 13, which is capable of being accessed at comparatively high speed, and a message in excess of the predetermined length is stored in the large-capacity secondary memory 15. As a result, messages possessing a variety of information quantities are capable of being preserved in mailboxes.

In accordance with each of the embodiments described above, storage and forward exchange can be performed even if a communication message comprising media information sent from a communication terminal has a length greater than a predetermined message length. This makes it possible to provide a message communication processing system in which utilization efficiency of the system as a whole is improved.

<Fifth Embodiment>

A fifth embodiment of the invention will be described in detail with reference to the drawings.

Figure 10:
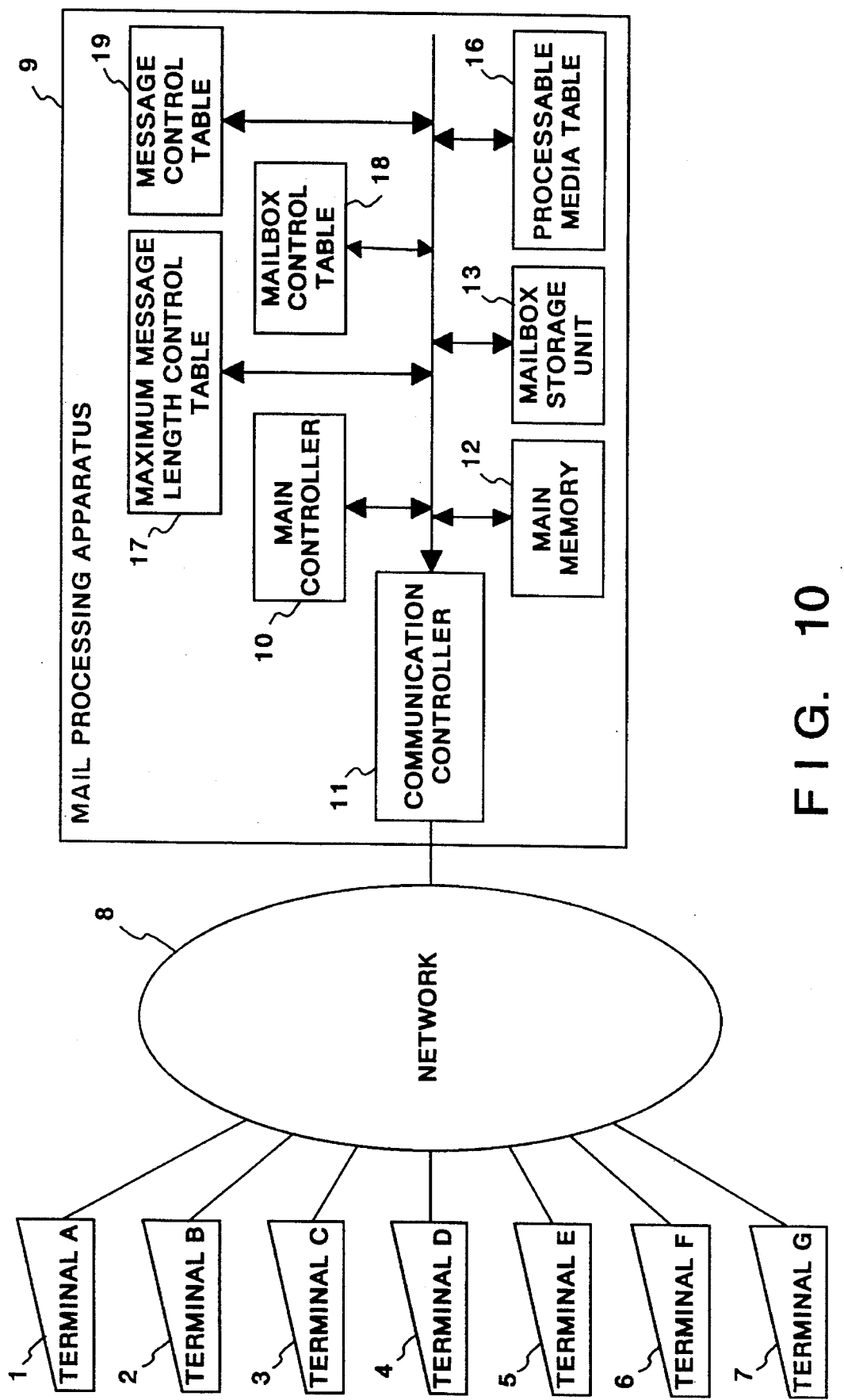
FIG. 10 is a system block diagram illustrating a multimedia message communication processing system according to a fifth embodiment of the present invention.

FIG. 10 is a system block diagram illustrating a multimedia message communication processing system according to a fifth embodiment of the present invention. As in the foregoing embodiments, the mail processing apparatus 9 includes the main controller 10 for administering overall control of the mail processing apparatus 9 in accordance with a processing procedure (program) that has been stored in the main memory 12, the communication controller 11 for controlling connection to the network 8, the aforementioned main memory 12 for storing the above-mentioned mail processing program as well as communication data and a table holding media capable of being processed by the group of mail terminals A~G, and the mailbox storage unit 13, which is constituted by a magnetic disk device or the like, for storing mailboxes allocated to each of the mail terminals A~G. The storage areas of each of the mailboxes have different capacities for each of the terminal classifications A~G.

The mail processing apparatus 9 further includes a processable media table 16 (FIG. 3), a table 17 (FIG. 11) for managing maximum message length, a mailbox control table 18 (FIG. 12), and a message control table 19 (FIG. 13). The tables 17~19 will be described in detail with reference to the drawings.

As shown in FIG. 11, the maximum message length control table 17 is a table for setting the allowed maximum length of a message in conformity with the media classification. For instance, in the example of FIG. 11, a maximum message length $ML_1$ is set for character-only media; $ML_2$ for image-only media; $ML_3$ for a combination of character and image media; $ML_4$ for audio-only media; $ML_5$ for a combination of character and audio media; $ML_6$ for a combination of image and audio media; and $ML_7$ for a combination of character, image and audio media.

The mailbox control table 18 shown in FIG. 12 is for managing the mailbox (MB) of the mailbox storage unit 13 provided for each of the terminals of the group of terminals (A~G) 1~7. As shown in FIG. 12, for every MB number ($MB_1$~$MB_n$ in this example), the table has a maximum storage field which indicates maximum information quantities $MV_1$~$MV_n$ capable of being stored, a preserved storage-quantity field which indicates information quantities $CV_1 \sim CV_n$ currently stored, a maximum message length field which indicates maximum message lengths $ML_1 \sim ML_n$ capable of being stored, a preserved message number field which indicates numbers $SC_1 \sim SC_n$ of messages currently stored, and a message control table-address field which indicates link addresses $SA_1 \sim SA_n$ of message control table 19 shown in FIG. 13.

The message control table 19 shown in FIG. 13 is provided for each of the number of mailboxes of mailbox storage unit 13 and for each of the number of messages stored in each mailbox. The number (m) of messages in each mailbox corresponds to the number $SC_1 \sim SC_n$ of messages in the mailbox control table 18 shown in FIG. 12. As shown in FIG. 13, the message control table 19 has, for each message (1~m), areas for storing the names of the sender and receiver of the message, the title of the message, the message registration date, the effective term of storage, the media classification, information quantity V and storage address of the mailbox of mailbox storage unit 13.

The details of mail exchange processing performed by the mail processing apparatus constructed as set forth above will now be described in accordance with the flowchart of FIG. 14. As set forth earlier, the mail processing apparatus, which is under the control of the main controller 10, executes the processing set forth below in accordance with the mail processing program stored in the main memory 12.

Figure 14:
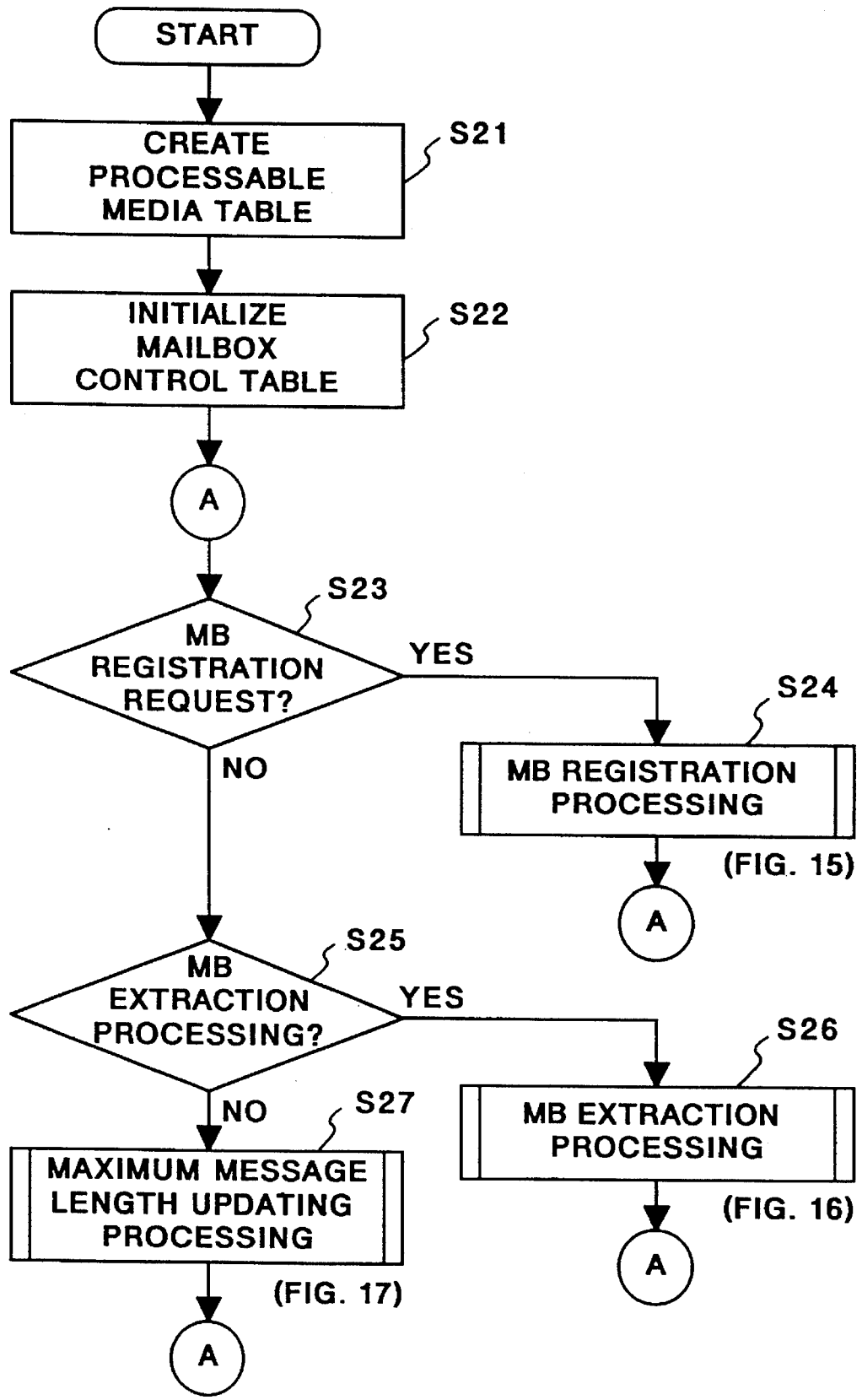
FIG. 14 is a flowchart illustrating the operation of a mail processing apparatus according to the fifth embodiment.

First, at step S21 in FIG. 14, the processable media table 16 (FIG. 3), which indicates the terminal classifications of the terminals 1~7 connectable to the network 8, is created, and then the initial setting of the mailbox control table 18 (FIG. 12) is performed at step S22. It should be noted that default values are set for the maximum information quantities $MV_1 \sim MV_n$ and maximum message lengths $ML_1 \sim ML_n$.

When this pre-processing has been completed, the mail processing apparatus 9 executes various electronic mail service processing operations from steps S23 onward. In this embodiment, an exemplary case will be described in which the terminal A1 of the terminal group 1 capable of processing characters only transmits character mail to the terminal C3 of terminal group 3 capable of processing characters and images. In this case, a mailbox (MB) registration request message is verified in the service classification field 21 of the message from terminal A1 to terminal C3, the name of the terminal A1 is written in the sender's name field 22, the name of terminal C3 is written in the receiver's name field 23, the character media classification is written in the media classification field 24, and the character message is written in the message body 26.

Figure 16:
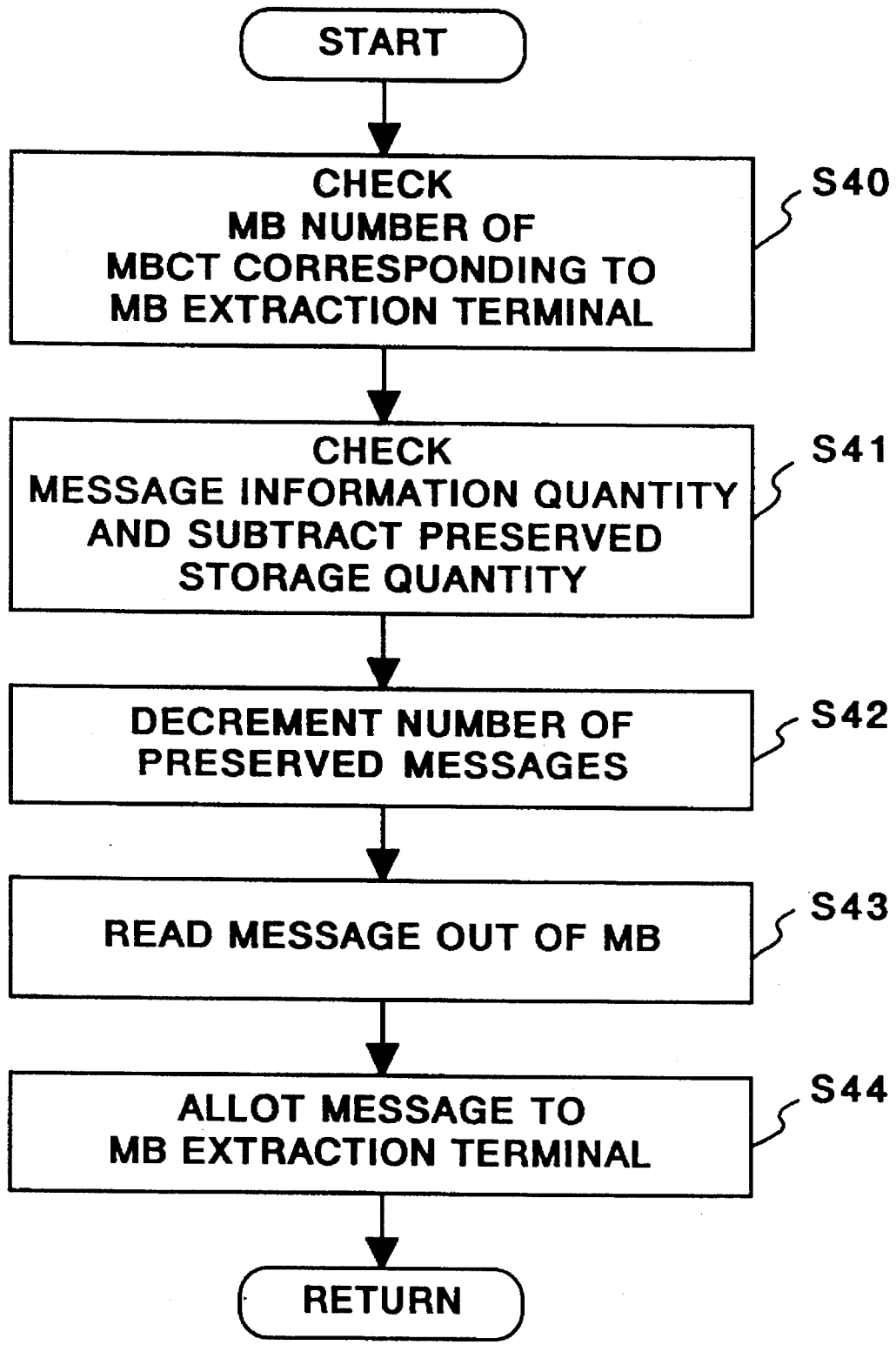
FIG. 16 is a flowchart illustrating a mailbox extraction processing routine of FIG. 14.
Figure 17:
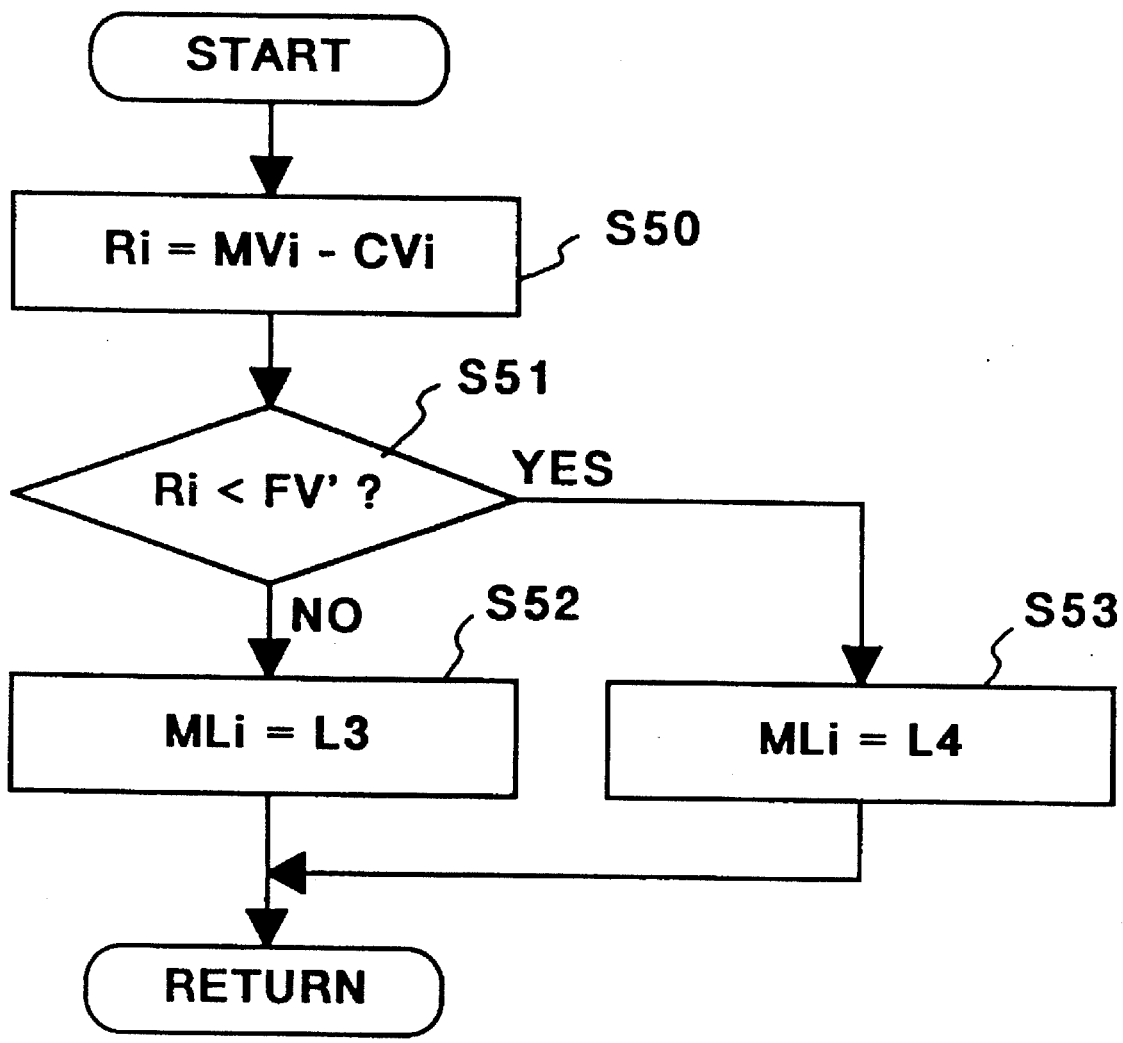
FIG. 17 is a flowchart illustrating a maximum message length updating processing routine of FIG. 14.

When the above-mentioned message is received via the communication controller 11, the mail processing apparatus 9 causes processing to proceed to step S23, at which the message header fields 21–25 are successively stored in the main memory 12 and the content of the service classification field 21 is discriminated. In case of an MB registration request message, an MB registration processing routine shown in detail in FIG. 15, described below, is executed at step S24. In case of MB extraction processing, an MB extraction processing routine shown in detail in FIG. 16 is executed at step S26. A processing routine for updating maximum message length shown in detail in FIG. 17 is executed at step S27 during the waiting time for received messages other than the foregoing.

The operation of the mailbox (MB) registration processing routine (step S24) of FIG. 14 will now be described in detail with reference to FIG. 15. First, step S30 calls for examination of the MB number $MB_i$ (i=1~n) of the mailbox control table (MBCT) 18 corresponding to the terminal C3 of the receiver's name field 23 of the received message. Next, at step S31, the maximum message length $ML_i$ corresponding to this MB number $MB_i$ is read out of the main memory 12. It is then determined at step S32 whether the message length of the message body 26 is greater than the maximum message length $ML_i$. If the maximum message length $ML_i$ has not been exceeded, the program proceeds to step S33. If the maximum message length $ML_i$ has been exceeded, the MB registration processing routine is suspended and the terminal A1 is so informed. In addition, the preserved storage quantity $CV_i$ of MBCT 18 is returned to the original value ($CV_i-V \rightarrow CV_i$) at step S39.

At step S35, the number $SC_i$ of preserved messages in the MBCT 18 is incremented ($SC_i+1 \rightarrow SC_i$), various control information is created by the information of fields 21–25 of the received message and this information is stored in the message control table (MSCT) 19. Then, at step S37, the message body 26 shown in FIG. 13 is stored in the mailbox (MB) of terminal C3 in mailbox storage unit 13.

The operation of the mailbox (MB) extraction processing routine (step S26) of FIG. 14 will now be described with reference to FIG. 16. When an MB extraction request message is received from the terminal C3, the program proceeds to step S40, which calls for examination of the MB number $MB_i$ of the message control table (MBCT) 18 corresponding to terminal C3 of the sender's name field 22. Then, at step S41, the information quantity V is checked by referring to the MBCT 18 and the message control table (MSCT) 19, and the extraction quantity V is subtracted from the preserved storage quantity $CV_i$ of MBCT 18 ($CV_i-V \rightarrow CV_i$).

At step S42, the number $SC_i$ of preserved messages in the MBCT 18 is incremented, the message is read out of the mailbox (MB) of terminal C3 in mailbox storage unit 13 at step S43, and then the message is allotted to the terminal C3 at step S44. In a case where the number $SC_i$ of preserved messages in the MBCT 18 is not "0" at step S44, the program returns to step S40, all messages are read out of the mailbox (MB) of terminal C in mailbox storage unit 13, and these messages are allotted to the terminal C3.

The operation of the maximum message length updating processing routine (step S27) of FIG. 14 will now be described with reference to FIG. 17. At step S50, reference is made to the mailbox control table (MBCT) to calculate a remaining capacity $R_i$ of the area (mailbox i) in mailbox storage unit 13 for every MB number $MB_i$. This is followed by step S51, at which it is determined whether the remaining capacity $R_i$ of the MB number $MB_i$ is less than a predetermined stipulated value FV'. In a case where the remaining capacity $R_i$ is equal to or greater than the stipulated value FV', this can be construed as meaning that the mailbox i still has some capacity unused. Accordingly, the maximum message length $ML_i$ of MBCT 18 is set to a larger length L3 (e.g., one megabyte) at step S52. However, in a case where the remaining capacity $R_i$ is less than the stipulated value FV', this can be construed as meaning that the mailbox i has no usable capacity left. As a result, the maximum message length $ML_i$ of MBCT 18 is set to a smaller length L4 (e.g., 64 kilobytes) at step S53.

In accordance with the fifth embodiment of the invention, the remaining capacity $R_i$ of each mailbox i of the mailbox storage area 13 is calculated from the maximum storage quantity $MV_i$ of the mailbox storage unit 18 and the preserved storage quantity $CV_i$, and the maximum length $ML_i$ of one message that is capable of being stored is adjusted as necessary. As a result, the maximum message length can be processed in a flexible manner for each and every media classification, thus making it possible to process multimedia.

In addition, since maximum message length is controlled in flexible fashion to enable processing of multimedia, the system need not be provided with more memory (storing means) capacity than necessary. This makes it possible to improve the efficiency at which the memory is used and to enlarge the quantity of messages which the system as a whole can store. Furthermore, by obtaining the remaining storage capacity of the storing means and comparing this with a predetermined threshold value, the maximum message length set by setting means can be changed. This makes it possible to give even fuller play to the foregoing effects.

As many apparently widely different embodiments of the present invention can be made without departing from the spirit and scope thereof, it is to be understood that the invention is not limited to the specific embodiments thereof except as defined in the appended claims.

What is claimed is:

1. In a message communication processing system which includes a plurality of communication terminals for processing media information and a center apparatus having a storage and forward exchange function for communication messages sent from the communication terminals, the messages comprising media information, said center apparatus comprising:

discriminating means for determining whether a message length of a message sent from a first terminal is greater than a predetermined length;

memory means for storing the message if said discriminating means determines that the message length of the message is not greater than the predetermined length;

first transmitting means for transmitting the message stored in said memory means to a second terminal in response to an instruction from said second terminal; and second transmitting means for transmitting the message sent from said first terminal directly to the second terminal without storing the message into said memory means if said discriminating means determines that the message length of the message is greater than the predetermined length.

2. The apparatus according to claim 1, wherein the message has a media classification in dependence on the media information it comprises, and wherein said second transmitting means transmits the message directly to the second terminal only if the media classification of the message is equal to a receivable media classification of the second terminal.

3. In a message communication processing system which includes a plurality of communication terminals for processing media information and a center apparatus having a storage and forward exchange function for communication messages sent from the communication terminals, the messages comprising media information and each formulated in a respective original medium, said center apparatus comprising:

discriminating means for determining whether a message length of the communication message sent from a first terminal is greater than a predetermined length;

memory means for storing the message if said discriminating means determines that the message length of the message is not greater than the predetermined length;

transmitting means for transmitting the message stored in said memory means to a second terminal in response to an instruction from said second terminal; and converting means for converting an original medium of the message sent from said first terminal to produce a converted message in a converted medium having a higher compression ratio than the original medium if said discriminating means determines that the message length of the message in the original medium is greater than the predetermined length, wherein said memory means stores the converted message if said discriminating means determines that a message length of the converted message is not greater than the predetermined length, and wherein the converted message is not stored if said discriminating means determines that the message length of the converted message is greater than the predetermined length.

4. The apparatus according to claim 3, wherein said converting means compresses and converts the original medium of the message into a medium capable of being processed by the second terminal.

5. The apparatus according to claim 3, wherein the converted message is discarded without being transmitted if the discriminating means determines that the message length of the converted message is greater than the predetermined length.

6. In a message communication processing system which includes a plurality of communication terminals for processing media information and a center apparatus having a storage and forward exchange function for communication messages sent from the communication terminals, the messages comprising media information and each formulated in a respective original medium, said center apparatus comprising:

discriminating means for determining whether a message length of a message sent from a first terminal is greater than a predetermined length;

memory means for storing the message sent from said first terminal if said discriminating means determines that the message length of the message is not greater than the predetermined length;

first transmitting means for transmitting the message stored in said memory means to a second terminal in response to an instruction from said second terminal;

converting means for converting an original medium of the message sent from said first terminal to produce a converted message in a converted medium capable of being processed by the second terminal if said discriminating means determines that the message length of the message in the original medium is greater than the predetermined length; and second transmitting means for transmitting the converted message directly to the second terminal without storing the converted message into said memory means.

7. The apparatus according to claim 5, wherein said converting means converts the original medium of the message into the converted medium by compression.

8. A message communication method of a message communication processing system which includes a plurality of communication terminals for processing media information and a center apparatus having a storage and forward exchange function for communication messages sent from the communication terminals, the messages comprising media information, said method comprising:

a discriminating step of determining whether a message length of the communication message sent from a first terminal is greater than a predetermined length;

a memory step of storing the message sent from the first terminal if said discriminating step determines that the message length of the message is not greater than the predetermined length;

a first transmitting step of transmitting the message stored in said memory step to a second terminal in response to an instruction from the second terminal; and a second transmitting step of transmitting the message sent from the first terminal directly to the second terminal without storing the message if said discriminating step determines that the message length of the message is greater than the predetermined length.

9. A message communication method of a message communication processing system which includes a plurality of communication terminals for processing media information and a center apparatus having a storage and forward exchange function for communication messages sent from the communication terminals, the messages comprising media information and each formulated in a respective medium, said method comprising:

a first discriminating step of determining whether a message length of the message sent from a first terminal is greater than a predetermined length;

a memory step of storing a message, wherein said memory step stores the message sent from the first terminal if said first discriminating step determines that the message length of the message sent from the first terminal is not greater than the predetermined length, if said first discriminating step determines that the message length of the message sent from the first terminal is greater than the predetermined length, a converting step of converting an original medium of the message sent from said first terminal to produce a converted message in a converted medium having a higher compression ratio than the original medium and a second discriminating step for determining whether a message length of the converted message is not greater than the predetermined length, wherein said memory step stores the converted message if said second discriminating step determines that the message length of the converted message is not greater than predetermined length, and a transmitting step of transmitting the message stored in said memory step to a second terminal in response to an instruction from the second terminal.

10. The method according to claim 9, wherein the message sent from the first terminal is discarded without being transmitted if the first discriminating step determines that the message length of the converted message is greater than the predetermined length.

11. The method according to claim 10, wherein the converted message is discarded without being transmitted if the second discriminating step determines that the message length of the converted message is greater than the predetermined length.

12. A message communication method of a message communication processing system which includes a plurality of communication terminals for processing media information and a center apparatus having a storage and forward exchange function for communication messages sent from the communication terminals, the message comprising media information, said method comprising:

a discriminating step of determining whether a message length of the message sent from a first terminal is greater than a predetermined length;

a memory step of storing the message sent from the first terminal if said discriminating step determines that the message length of the message is not greater than the predetermined length;

a first transmitting step of transmitting the message stored in said memory step to a second terminal in accordance with an instruction from the second terminal;

a converting step of converting an original medium of the message sent from the first terminal to produce a converted message having a converted medium capable of being processed by the second terminal if said discriminating step determines that the message length of the message in the original medium is greater than the predetermined length; and a second transmitting step of transmitting the converted message directly to the second terminal without storing the message.

* * * * *

UNITED STATES PATENT AND TRADEMARK OFFICE
CERTIFICATE OF CORRECTION

PATENT NO.  : 5,548,789
DATED       : August 20, 1996
INVENTOR    : YASUO NAKAMURA It is certified that error appears in the above-identified patent and that said Letters Patent is hereby corrected as shown below:

On the title page, items

[19]

Unites States Patent
"Nakanura" should read --Nakamura--.

[75]

Inventor:   "Yasuo Nakanura" should read --Yasuo Nakamura--.

Signed and Sealed this

Nineteenth Day of May, 1998

Attest:

BRUCE LEHMAN

Attesting Officer            Commissioner of Patents and Trademarks